United States Patent
Wikkerink et al.

(10) Patent No.: US 9,434,556 B2
(45) Date of Patent: Sep. 6, 2016

(54) EGG CHAIN GRIPPER ACTUATING DEVICE AND EGG TRANSFER DEVICE

(71) Applicant: Sanovo Technology Netherlands B.V., Aalten (NL)

(72) Inventors: Dirk Willem Wikkerink, Aalten (NL); Jan Willem Pennings, Gendringen (NL); Peter Anton Van Asselt, Aalten (NL); Jan Hordijk, Aalten (NL)

(73) Assignee: Sanovo Technology Netherlands B.V., Aalten (NL)

( * ) Notice: Subject to any disclaimer, the term of this patent is extended or adjusted under 35 U.S.C. 154(b) by 0 days.

(21) Appl. No.: 14/708,008

(22) Filed: May 8, 2015

(65) Prior Publication Data

US 2015/0239681 A1   Aug. 27, 2015

Related U.S. Application Data

(62) Division of application No. 13/819,706, filed as application No. PCT/NL2010/050548 on Sep. 1, 2010, now Pat. No. 9,038,812.

(51) Int. Cl.
*B65G 37/00* (2006.01)
*B65G 49/05* (2006.01)
(Continued)

(52) U.S. Cl.
CPC .............. *B65G 49/05* (2013.01); *B65B 23/06* (2013.01); *B65G 17/20* (2013.01); *B65G 37/00* (2013.01); *B65G 47/841* (2013.01); *B65G 2201/0208* (2013.01)

(58) Field of Classification Search
CPC .... B65G 49/05; B65G 17/20; B65G 17/323; B65G 37/00; B65G 47/38; B65G 47/841; B65G 47/842

USPC ........... 198/469.1–472.1, 474.1–477.1, 793, 198/803.3, 803.4, 803.5, 803.6, 803.7, 198/803.8, 803.9, 803.1, 577

See application file for complete search history.

(56) References Cited

U.S. PATENT DOCUMENTS 3,034,626 A * 5/1962 Kay ......................... B23F 23/04
                                                                193/32
4,487,321 A * 12/1984 Bliss ...................... A01K 43/00
                                                                209/510

(Continued)

FOREIGN PATENT DOCUMENTS

EP    0588412 A1    3/1994
EP    0930235 A1    7/1999

(Continued)

OTHER PUBLICATIONS

International Search Report and Written Opinion mailed Jul. 19, 2011 in Int'l Patent Application No. PCT/NL2010/050548, 9 pages.

*Primary Examiner* — William R Harp
(74) *Attorney, Agent, or Firm* — Kilpatrick Townsend & Stockton LLP

(57) ABSTRACT

An egg chain gripper actuating device for use with an egg transfer device. The device has an egg conveyor with parallel egg chains movable in a transport direction, each chain supporting egg grippers, which can be individually actuated. The device further comprises an egg receiving unit with a receiving area for receiving eggs released by the egg grippers, and one group of one or more actuators for each egg chain for selectively actuating passing egg grippers. Multiple support frames are provided, each supporting one or more groups of actuators. At least one frame is adjustable parallel to the transport direction and relative to another frame, such that the position of the actuators of the one or more groups supported by the frame can be adjusted relative to the position of the one of more actuators of the one or more groups supported by the other frame.

18 Claims, 7 Drawing Sheets

(51) Int. Cl.
   *B65B 23/06* (2006.01)
   *B65G 47/84* (2006.01)
   *B65G 17/20* (2006.01)

(56) References Cited

U.S. PATENT DOCUMENTS

| | | | |
|---|---|---|---|
| 4,488,637 A * | 12/1984 | Loeffler | B65B 23/08 198/803.9 |
| 4,505,373 A | 3/1985 | Thomas | |
| 4,519,494 A | 5/1985 | McEvoy et al. | |
| 4,519,505 A | 5/1985 | Thomas | |
| 4,776,465 A | 10/1988 | McEvoy et al. | |
| 5,160,019 A * | 11/1992 | Temming | B65B 23/08 198/470.1 |
| 5,167,317 A * | 12/1992 | van der Schoot | A01K 43/00 198/469.1 |
| 5,168,977 A * | 12/1992 | van Essen | B65G 17/323 198/364 |
| 5,232,080 A | 8/1993 | van Essen et al. | |
| 5,918,726 A * | 7/1999 | Temmink | B65B 23/08 198/370.03 |
| 6,029,424 A | 2/2000 | McEvoy et al. | |
| 8,387,775 B2 * | 3/2013 | Mckeown | B65B 23/06 198/364 |
| 9,038,812 B2 * | 5/2015 | Wikkerink | B65B 23/06 198/577 |

FOREIGN PATENT DOCUMENTS

| | | |
|---|---|---|
| NL | 6717724 A | 7/1969 |
| WO | 2010/028348 A2 | 3/2010 |

\* cited by examiner

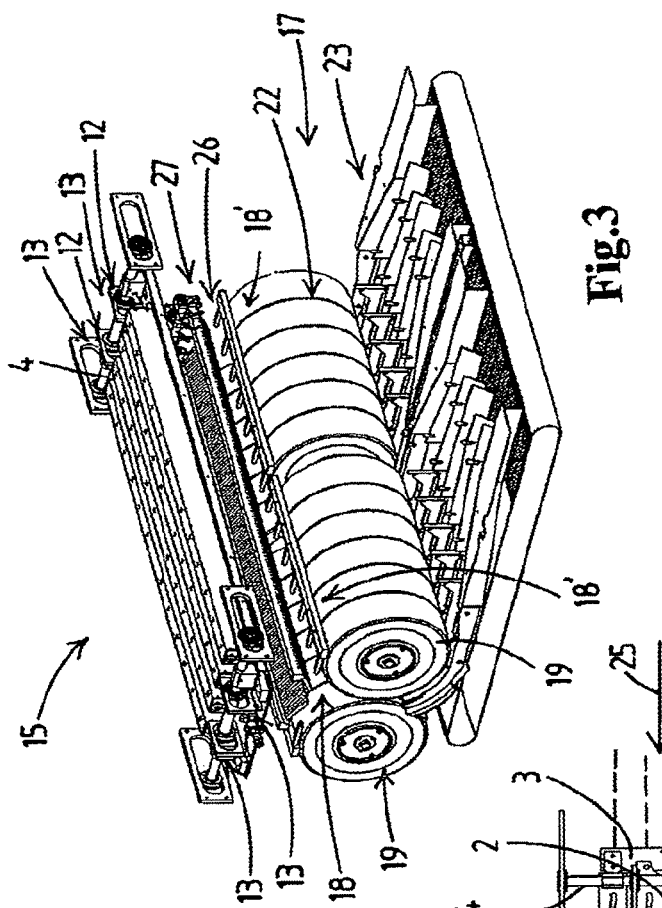
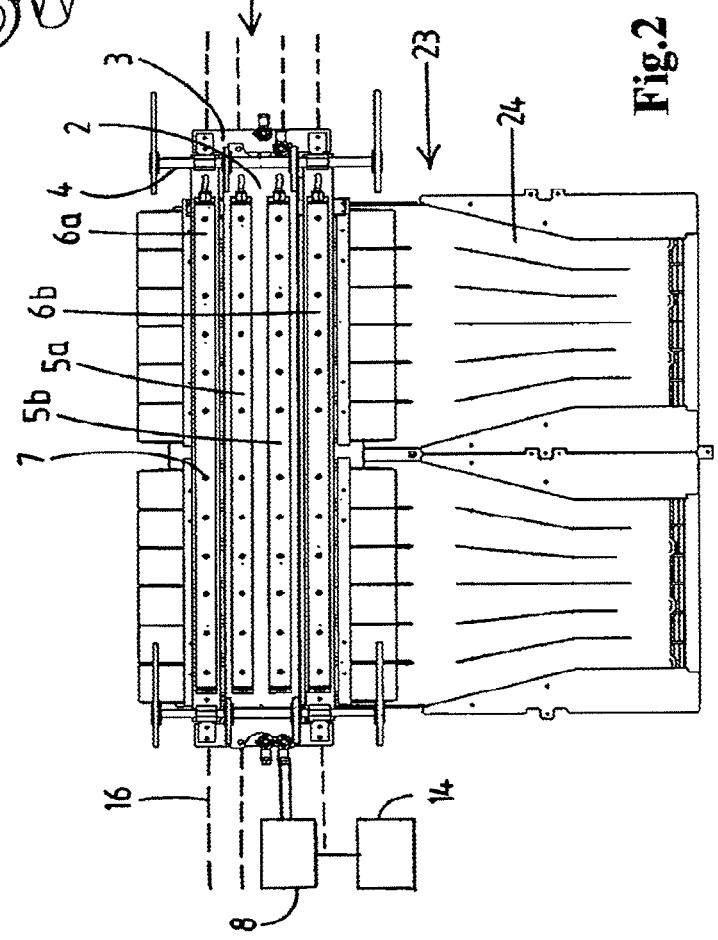
Fig.3
Fig.2

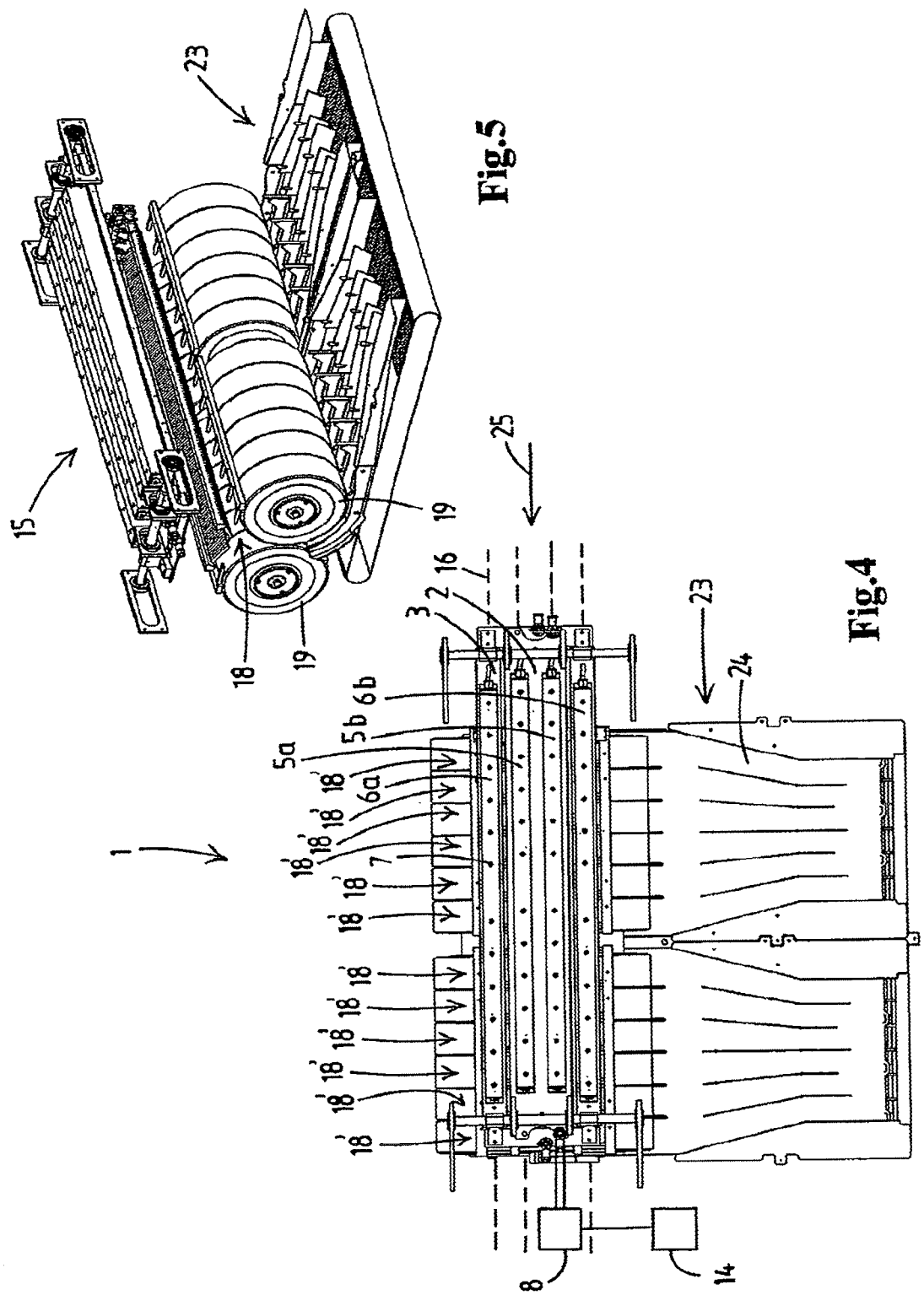

EGG CHAIN GRIPPER ACTUATING DEVICE AND EGG TRANSFER DEVICE

CROSS-REFERENCES TO RELATED APPLICATIONS

This application is a divisional of U.S. patent application Ser. No. 13/819,706, filed Apr. 17, 2013, which is a U.S. National Phase of PCT/NL2010/050548, filed Sep. 1, 2010, the disclosures of which are incorporated by reference herein in their entirety.

BACKGROUND OF THE INVENTION

A first aspect of the application relates to an egg chain gripper actuating device for use with an egg transfer device.

Actuating devices for use with grippers are known in the prior art. Typically, egg transfer devices are provided with an egg conveyor comprising two or more parallel egg chains movable in a transport direction. Each egg chain supports a plurality of egg grippers which are each adapted to support an egg. The grippers can individually be actuated from a closed position, for supporting an egg, into an open position, for releasing an egg. The egg conveyor furthermore comprises an egg chain conveyor drive for driving the egg chains at a transport speed.

The eggs are dropped from the moving grippers into an egg receiving unit with a receiving area for receiving eggs released by the egg grippers. The receiving area is for example defined by a pair of counter rotating brush wheels, and is located below the egg conveyor such that the vertical distance between one egg chain and the receiving area is larger than the vertical distance between an adjacent egg chain and the receiving area.

For activating the grippers, actuators are provided. The actuators actuate passing egg grippers into an open position to release an egg. The released egg drops form the gripper into the brush wheels. Due to the speed of the egg chain at the moment of release, the egg follows a parabolic trajectory from a release spot at which it is released by the gripper and a contact spot at which it contacts the brush wheel.

The actuators are positioned such that at a given speed of the egg chain, the eggs lands in the correct area on the brush wheels. From WO 2010/028348 it is known to compensate for a change in speed of the egg chains by adjusting the position of the actuators. When the speed of the egg chains increases, the actuators are moved up stream such that the released eggs still drop on the brush wheels. However, this solution only allows for limited speed changes.

BRIEF SUMMARY OF THE INVENTION

The first aspect of the present invention aims to provide an alternative egg chain gripper actuating device, which preferably overcomes, or at least reduce, the above mentioned problems.

According to the first aspect thereof the invention provides an egg chain gripper actuating device and an egg transfer actuating device. The first aspect of the invention furthermore provides a method for adapting the position of actuators.

An egg chain gripper actuating device according to the first aspect of the invention comprises one group of one or more actuators for each of the at least two egg chains of the transfer device it is to be used with. The actuators are designed for selectively actuating passing egg grippers into an open position to release an egg such that the released egg follows a parabolic trajectory from a release spot at which it is released by the gripper and a contact spot at which it contacts the receiving area.

The egg chain gripper actuating device furthermore comprises multiple support frames, each supporting one or more groups of actuators. Of these frames, at least one is adjustable parallel to the transport direction and relative to another frame, such that the position of the actuators of the one or more groups supported by the frame can be adjusted relative to the position of the one of more actuators of the one or more groups supported by the other frame.

The actuating device according to the first aspect of the invention allows for adjusting the position of the group or groups of actuators for actuating the grippers of an egg chain or egg chains respectively, independent of the position of the group or groups of actuators for actuating the grippers of another egg chain or egg chains respectively. This is beneficial since this allows for adjusting the position of the actuators in accordance with the specific characteristics of the particular egg chain, or group of egg chains, and thus for more accurate adjustment.

For example, when the receiving area is defined by a pair of counter rotating brush wheels, the receiving area is essentially V-shaped, having a bottom region and a top region. The latter is formed by the upper ends of the two flanks Eggs released by egg chains located above the bottom portion of the receiving area drop over a larger vertical distance than eggs released by egg chains located above the top portion of the receiving area. Thus, a change in speed of the egg chains is of bigger influence for those eggs dropped by the egg chains located above the bottom portion than by the eggs dropped by egg chains located above the top portion of the receiving area.

With an actuating device according to the first aspect of the invention, at least one support frame is adjustable parallel to the transport direction and relative to another support frame or other support frames. The at least one support frame allows for adjusting the location of the actuators for actuating the grippers of an egg chain located above the lower portion of the receiving area independent of the actuators for actuating the grippers of an egg chain located above the higher portion. Thus, the actuators can be set such that an egg dropped above the bottom portion of the receiving area and an egg dropped above the upper portion of the receiving area are, when seen perpendicular to the transport direction, received in the brush wheel at about the same location, and/or are dropped from the brush wheels at about the same location.

Preferably at least one frame supports two or more groups of actuators for locating along two or more egg chains respectively, which egg chains are located at a similar vertical distance above the receiving area such that they drop their eggs along parabolic trajectories of similar length. Thus, by adjusting the position of a single frame, the drop trajectories for multiple egg chains can be adjusted correctly. This is especially beneficial when the receiving area is symmetrical shaped. For example, a receiving area defined by two counter rotating brush wheels is an essentially V-shaped symmetrical receiving area. When an egg chain is provided above each flank of the receiving area, such that the vertical distance between the grippers supported by the flanks and the receiving area is essentially the same, the trajectory of the eggs dropped above the receiving areas is the same for both egg chains and is influenced by a change of speed of the egg chains in the same manner. Preferably, the frames supporting the one or more actuators located along the respective egg chains are linked such that the trajectory of the eggs dropped from the chains can be adjusted for both egg chains by adjusting the position of one frame.

Preferably the actuating device according to the first aspect of the invention further comprises at least one drive for adjusting the position of one or more support frames, and a control device to control the at least one drive. Thus the system can simply be mounted into an egg transfer device and does not need to be connected to the control device of the transfer device to allow operation. In an alternative embodiment, the control device of the egg transfer device is used to control the one or more drives.

The control device is preferably designed for receiving egg chain conveyor transport speed information and to use this information to control the at least one drive to adjust the position of the one or more movable frames linked in dependence of the transport speed. Thus the control device can adjust the position of the frames automatically when the transport speed of the egg chains changes.

Preferably, the adjustment of a first set of one or more adjustable support frames for supporting one or more groups of actuators adjacent one or more egg chains located at a first vertical distance above a receiving area, is linked to the adjustment of at least one second set of one or more adjustable support frames for supporting one or more groups of actuators adjacent one or more egg chains located at a second vertical distance above a receiving area, which second vertical distance differs from the first vertical distance. In this embodiment, the at least two sets of adjustable support frames are linked such that when the position of the first set of frames is adjusted to compensate for a change in speed of the egg chains, the position of the second set of frames is correctly adjusted also. Thus, the frames can be adjusted by a single drive.

In a further preferred embodiment, the at least two sets of adjustable support frames are mechanically linked, for example via a linkage system, such that one drive can be used to move each set over a different distance. A mechanical linkage provides a simple and reliable link.

In a further preferred alternative embodiment, the at least two sets of adjustable support frames are each linked to the drive via a separate transmission, which transmissions are designed such that the one drive can be used to move each set over a different distance.

In a further preferred alternative embodiment, at least two sets of adjustable support frames are each provided with a drive, and the control device is designed to control the drives such that each set can be moved over a different distance. By providing a drive for each set of frames, the location of the support frames can each be individually controlled.

Preferably, each frame is provided with multiple locations for fastening an actuator, such that the location of the one or more actuators in the frame can be adapted to allow usage of the actuating device with egg transfer devices that require a different configuration of actuators in the frame.

The first aspect of the invention furthermore provides an egg transfer device comprising an egg conveyor, an egg receiving unit and an actuating device according to the first aspect of the invention.

The egg conveyor comprises two or more parallel egg chains movable in a transport direction. Each egg chain supports a plurality of egg grippers each adapted to support an egg, which grippers can individually be actuated from a closed position, for supporting an egg, into an open position, for releasing an egg. The egg conveyor furthermore comprises an egg chain conveyor drive for driving the egg chains at a transport speed.

The egg receiving unit is provided with a receiving area for receiving eggs released by the egg grippers, which receiving area is defined by at least one brush wheel rotatable about an axle parallel to the transport direction of the egg chains. The receiving area is located below the egg conveyor such that the vertical distance between one egg chain and the receiving area is larger than the vertical distance between another egg chain and the receiving area.

Preferably, at least one adjustable support frame is located, relative to the one or more other frames for supporting the actuators along an egg chain, above a bottom portion of the receiving area, i.e. the egg chain located at the largest vertical distance above the receiving area. Thus, the position of the actuators for activating the grippers of at least the egg chain of which the trajectory of a dropped egg is most influenced by changes in the transport speed, is adjustable. In a preferred embodiment according to the first aspect of the invention, multiple adjustable support frames are provided.

In a further preferred embodiment, at least one adjustable support frame is provided for supporting the group of actuators for two or more egg chains which egg chains are located at the same vertical distance above the receiving area. Thus, the location of the actuators of these actuators can be adjusted by moving a single of support frames.

For example, in a preferred embodiment, the receiving area is defined by a pair of counter rotating brush wheels located adjacent each other. Each of the brush wheels is rotatable about an axle parallel to the transport direction of the egg chains and both are located below the egg chains. Thus, a symmetrical, essentially V-shaped receiving area is provided, which comprises a bottom portion and the top portions located on the flanks The receiving area allows for providing egg chains above the opposite flanks located at the same height above the receiving area. In a preferred embodiment, the groups of actuators linked to the egg chains located at the same height above the receiving area are supported on a single frame, such that by adjusting the position of a single frame, the trajectory for multiple frames can be adjusted.

In an alternative embodiment the receiving area is defined by the at least one brush wheel rotatable about an axle parallel to the transport direction of the egg chains and a curved guide surface adjacent said brush wheel. In this embodiment, the eggs are dropped in the brush wheel and all egg chains are located at a different height above the receiving area.

In a preferred embodiment the egg chain conveyor drive is a variable speed drive for driving the egg chains at an adjustable transport speed. Thus the number of eggs supplied in a given time frame can be adjusted. In a further preferred embodiment according to the first aspect of the invention, the control device controlling the drive for adjusting the one or more support frames, is designed for receiving egg chain conveyor transport speed information and to use this information to control the at least one drive to adjust the position of the one or more movable frames linked in dependence of the transport speed.

In a further preferred embodiment, the receiving area is in the transport direction divided into multiple adjacent receiving areas, and each egg chain is provided with an actuator linked to each receiving area. Thus, by adjusting the position of a single support frame, the actuators for the receiving areas located along the brush wheel are all positioned to compensate the drop trajectory of the released eggs, such that the eggs fall within the receiving area.

In a further preferred embodiment, divider brushes are provided above and between the receiving areas to prevent eggs from skidding over the brush wheel into the adjacent receiving area.

Preferably, an egg transfer device according to the first aspect of the invention comprises braking brushes which are provided above the brush wheels to reduce the falling speed of the eggs prior to falling into the brush wheels. The braking brushes are provided such that the bristles of the brushes extend in a horizontal or slightly downward direction and at an angle with the transport direction, preferably perpendicular to the transport direction. Eggs dropped into the brushes, of which the bristles extend at an angle with the trajectory of the egg, bends the bristles while dropping further downward. The bristles thus slow down the egg and adjust the trajectory of the falling egg.

Preferably, brushes are provided on opposite sides of the receiving area, with their bristles directed towards the centre of the receiving area. The brushes thus also guide the eggs towards the centre of the receiving area. One brush may receive eggs form one or from more egg chains. In a further embodiment, each egg chain is provided with one brush, extending along the length of the receiving area.

Providing braking brushes below the grippers reduces the speed of the released eggs and thus reduces amount of change in the drop trajectory of released egg caused by changers in the transport speed. It is observed that these braking brushes can also be applied without the activating device. By providing braking brushes, an increase in the transport speed of the egg chains can be obtained, without adjusting the size of the receiving areas the eggs are dropped into.

Furthermore, the transport speed of the egg chains of a given egg transfer device can be increased without the need of adjusting the receiving area by providing braking brushes according to the invention. Thus the volume of eggs to be transferred by the device per time unit can be increased without the need of elaborate and costly adjustments of the transfer device, in particular without replacing the receiving unit receiving the dropped eggs.

Preferably, an egg transfer device according to the first aspect of the invention further comprises one or more collecting devices, preferably collecting devices comprising lanes associated with each receiving area. The collecting devices are located below the brush wheels for receiving eggs dropped from the brush wheels. The collecting devices have a length perpendicular to the transport direction and a width parallel to the transport direction.

The first aspect of the invention furthermore provides a method for adapting the position of actuators for actuating egg grippers supported by egg chains which are located at different heights above a receiving area, using an actuating device according to the first aspect of the invention to compensate for a change in the speed of the egg chains, which compensation differs in dependence on the vertical distance between the egg chain, more in particular the grippers supported by that egg chain, and the receiving area.

A second aspect of the invention is related to an egg transfer device comprising multiple parallel egg chains provided with grippers and a method using such a transfer device.

Egg transfer devices comprising one or more parallel egg chains are known in the prior art. For example EP 0 588 412 discloses an egg transfer device comprising multiple parallel egg chains supporting egg grippers for holding eggs and transferring the eggs in a transport direction. The eggs are typically supplied via a supply conveyor in a supply direction perpendicular to the transport direction. The eggs are lifted into the egg chains by a transfer unit. The transfer unit follows an endless, oval trajectory extending in a plane parallel to the transport direction. The transfer unit lifts the eggs from a transfer buffer, and accelerates into the transport direction perpendicular to the supply direction to present the eggs to the egg grippers moving in the transport direction. The prior art design requires substantial acceleration of the eggs over a short distance to bring the eggs up to speed with the egg chains, which typically move at high transport speeds to enable a substantial flow through of egg with a minimum number of egg chains. The acceleration increases the risk of the fragile egg braking during the transfer into the egg chains.

The second aspect of the present invention aims to provide an alternative egg transfer device which preferably overcomes, or at least reduce, the above mentioned problems.

This object is achieved by the second aspect of the invention providing an egg transfer device. The second aspect of the invention furthermore provides a method for using such an egg transfer device.

An egg transfer device according to the second aspect of the invention comprises multiple parallel egg chains provided with grippers for engaging eggs and for carrying the eggs along the lower run of the egg chains, at a transport speed and in a transport direction.

The egg transfer device is furthermore provided with a transfer buffer for receiving multiple rows of eggs from a supply conveyor. The transfer buffer is located below the egg chains and comprises movable egg supports for supporting eggs while moving them at a supply speed in a supply direction.

The egg transfer device also comprises a transfer unit for lifting multiple rows of eggs from the transfer buffer into a transfer location above the transfer buffer and directly below the egg chains for feeding the eggs into the grippers. The transfer unit is supported by a driven support for moving the transfer unit along an endless transfer trajectory extending in a vertical plane parallel to the supply direction such that the transfer unit can be moved from a start location, via a lift up location for engaging the eggs, into the transfer location and back down into the start location. The driven support is designed such that in the lift up location the transfer unit moves in the supply direction, preferably with the supply speed, as well as in the upward direction through the transfer buffer for picking up the eggs during transport by the transfer buffer in the supply direction.

The driven support is furthermore designed such that the direction of movement of the transfer unit in the transfer location is inverted from an essentially upward direction into an essentially downward direction such that an egg is transferred in to an essentially vertical direction into a gripper.

An egg transfer device comprising a transfer buffer and transfer unit according to the second aspect of the invention is optimally equipped for receiving eggs from a conveyor and feeding them into egg chain supported grippers. The transfer unit is supported by a driven support which is designed such that the transfer unit of the device is moved along a transfer trajectory which allows for optimal engaging the eggs from the transfer buffer, and optimally presenting the eggs to the grippers of the egg chains.

The driven support is designed such that the transfer unit is moved along the transfer trajectory such that in the lift up location the transfer unit moves in the supply direction as well as in the upward direction through the transfer buffer for picking up the eggs during transport by the transfer buffer in the supply direction. Thus, the eggs can be lifted from the transfer buffer while still being transported in the supply direction. This allows for transfer of the eggs with minimal accelerations, and thus minimizes the chance of breakage of the eggs. The main acceleration is directed upwards such that the eggs are presses securely into the transfer unit. Furthermore, no acceleration is present in a direction perpendicular to the supply direction which contributes to a steady support of the eggs by the transfer unit.

The driven support is furthermore designed such that the direction of movement of the transfer unit in the transfer location is inverted from an essentially upward direction into an essentially downward direction such that an egg is transferred in to an essentially vertical direction into a gripper. Thus the eggs are moved upward into the downward hanging grippers, without substantial movement in other directions. Preferably, the egg is engaged by the gripper when its movement is inverted from upward to downward, at which moment the vertical speed is zero.

With an egg transfer device according to the second aspect of the invention, eggs are fed into the egg chains in a direction parallel to the supply direction such that the egg is not accelerated in a direction perpendicular to the supply direction, furthermore, the eggs are in one single movement fed into the egg grippers in a vertical direction, which allows for optimal engagement by the egg grippers which typically hang down from the egg chains.

Preferably, the start location of the transfer unit trajectory is located below the transfer buffer. In this embodiment the egg transfer buffer is provided with parallel fingers extending in the supply direction, which fingers support the egg supports for movement along the fingers in a supply direction. Furthermore, the egg transfer unit comprises parallel fingers for supporting eggs which fingers are configured for cooperating with the fingers of the transfer buffer such that the fingers of the transfer unit can move between the fingers of the buffer to engage the eggs from below and lift them from the egg supports.

This configuration of the transfer device facilitates feeding eggs from a transfer conveyor into the egg chains. The fingers on both the transfer unit and the buffer allows for the transfer unit to move its fingers between the fingers of the transfer buffer, and to engage the eggs supported by the transfer buffer from below.

Preferably, the driven support is designed such that the direction of movement of the transfer unit in the start location is inverted from a movement essentially contrary to the supply direction to a movement into the supply direction. The transfer unit is moved into the start position in an essentially horizontal direction, which allows to correctly position the transfer unit below the transfer buffer in an efficient way, and via a compact space. In prior art devices, the transfer unit is typically moved along a curved trajectory which requires more space to allow the transfer unit to be correctly positioned.

Preferably, an egg transfer device according to the second aspect of the invention comprises a movable support frame for supporting a looped section of the egg chains adjacent the transfer location, which support frame is supported for movement parallel to the transport direction. A section of the lower run of the egg chains is looped via a first loop wheel and a second loop wheel over the movably mounted support frame such that a section of the egg chains extends adjacent the transfer location. The frame comprises a first guide wheel at one end for receiving the egg chains from the first loop wheel and a second guide wheel at an opposite end for guiding the egg chains towards the second loop wheel. Furthermore, a drive for is provided for moving the support frame parallel to the transport direction such that when the frame is moved contrary to the transport direction the movement of the section of the egg chains adjacent the transfer location is reduced relative to the transport speed such that the eggs supported by the transfer unit can be transferred into the grippers.

With this embodiment, a section of the egg chains can be slowed down to allow the grippers to engage the eggs while moving at a speed lower than the transport speed. The egg transfer device thus facilitates engagement of the eggs by the grippers. Preferably, the egg transfer device is provided with a drive which moves the support frame contrary to the transport direction with such a speed that the movement of the section of the egg chains adjacent the transfer location is essentially stopped, and the grippers are essentially stationary in the transfer location when engaging the eggs. Thus, the eggs can be fed in an essentially vertical direction into stationary grippers, which facilitates engaging the eggs by the grippers.

It is observed that with an egg transfer device according to the second aspect of the invention only a section of the egg chains is movably supported. The main part of the egg chains can be supported by fixed frames and driven by a fixed drive. Since the movable support frame only supports a section of egg chains, it can be small and light compared to the support frame supporting the egg chains, which in turn facilitates quick and iterative movement of the support frame.

Furthermore, with an egg transfer device according to the second aspect of the invention, the speed of only a section of the egg chains is reduced. The main part of the egg chains moves at transport speed while the section is slowed down for picking up eggs. The transfer device thus allows for transferring already picked up eggs at transport speed while new eggs are fed into the egg chain. Thus, the transport and the processing of the picked up eggs, for example providing the eggs to a packing device of presenting the eggs to optical scanning devices, downstream of the transfer location is not hindered and no time is lost.

By providing a transfer buffer and transfer unit for presenting the egg to the egg chains in an essentially vertical direction, in combination with a movable support frame which allows to slow down the egg chains, the egg transfer unit is optimally equipped for receiving eggs form a conveyor, in particular a conveyor which provides eggs in a supply direction perpendicular to the egg transport direction.

Providing the eggs in a supply direction perpendicular to the transport direction is preferred since it allows for changing the product flow from a low speed large width supply flow into a high speed small width transfer flow. For example, the egg supply conveyor, typically a slow speed transport device, provides a flow of eggs constituted by eight parallel rows of eggs, the rows extending in the supply direction. By lifting the eggs into for example four parallel egg chains, which are typical high speed transport devices, the flow is transferred into a narrow flow of eggs, which is four rows wide instead of eight. In a further exemplary embodiment, the eggs are provided in eight parallel flows and transferred into four parallel egg chains.

In a further embodiment of an egg transfer device according to the second aspect of the invention, a drop off location for dropping off eggs is provided along the lower run of the egg chains, downstream of the looped section and the transfer location. Preferably, the egg transfer embodiment further comprises an additional movable support frame, similar to the one described above, for supporting a looped section of the egg chains adjacent the drop off location such that the movement of the section of the egg chains adjacent the drop off location can be temporarily reduced to drop off eggs. Thus, the movement of the eggs in the horizontal plane is at least reduced relative to the transport speed, preferably the egg is held stationary, such that it can be dropped into stationary receiving devices, such as a receptacle or packaging, with more accuracy. Dropping the eggs from stationary grippers highly increase the precision of delivery. Furthermore, the receptacle for receiving the eggs can be provided without bringing it up to the transport speed of the egg chains. Thus presenting the receptacle is facilitated. In the prior art, the transport speed is often limited to allow for accurate feeding of egg into receptacles.

The second aspect of the invention furthermore provides a method for transferring eggs from a transfer location to a drop off location using an egg transfer device as described above.

A third aspect of the invention is related to an egg transfer device comprising braking brushes to reduce the speed of egg dropped form a moving egg chain. The braking brushes provide a simple and low cost solution in limiting the change in the drop trajectory of egg released by the moving egg chains at an increased speed. The transport speed of the egg chains, and thus the volume of processed egg per time unit, can thus be increased without the need of elaborate adjustments to the transfer device, in particular without replacing the receiving unit for receiving the eggs.

It will be appreciated that this second and or third aspect of the invention can advantageously be integrated in the egg transfer device according to the first aspect of the invention.

Further objects, embodiments and elaborations of the apparatus and the methods according to the first aspect of the invention will be apparent from the following description, in which the invention is further illustrated and elucidated on the basis of a number of exemplary embodiments, with reference to the drawings, in which:

BRIEF DESCRIPTION OF THE DRAWINGS

FIG. 2 shows a top view of an egg transfer device according to the first aspect of the invention with transfer frames in a first position;

FIG. 3 shows a perspective view of the transfer device of FIG. 2;

FIG. 4 shows a top view of the egg transfer device of FIG. 2 with the transfer frames in a second position;

FIG. 5 shows a perspective view of the transfer device of FIG. 4;

DETAILED DESCRIPTION OF THE INVENTION

The first aspect of the present invention will now be explained referring to FIGS. 1-7.

Figure 1:
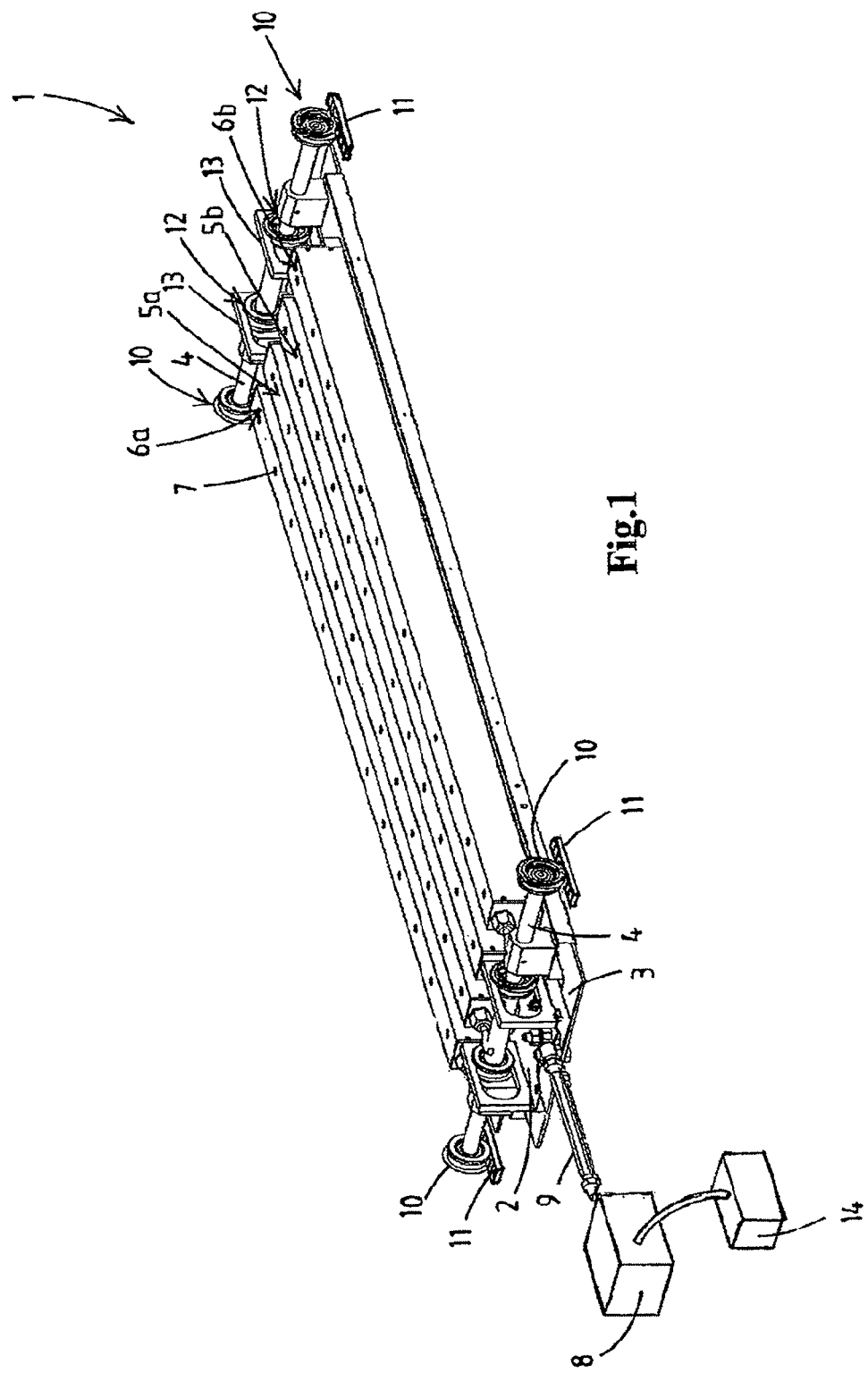
FIG. 1 shows a perspective view of an activating device according to the first aspect of the invention.

FIG. 1 shows a perspective view of an egg chain gripper actuating device 1 according to the first aspect of the invention. An actuating device according to the first aspect of the invention comprises one group of one or more actuators for each egg chain of the transfer device it is to be used with, and multiple support frames, each supporting one or more groups of actuators.

In the particular embodiment shown in FIG. 1 the actuating device 1 is provided with one group of twelve actuators 7 for each of four egg chains. The actuating device is furthermore provided with two support frames, one frame 2 supporting the middle two groups 5a, 5b of actuators and one frame 3 supporting the two outside groups of actuators 6a, 6b.

The actuating device 1 shown is thus designed for use with an egg transfer unit comprising four parallel egg chains. In practice, the egg chain gripper actuating device is located above the egg chains with one group of actuators located adjacent each egg chain. The actuators 7 are designed for selectively actuating passing egg grippers into an open position to release an egg. The released egg drops downward. Due to the movement of the grippers in the transport direction at the moment of release, the egg follows a parabolic trajectory from a release spot at which it is released by the gripper to a contact spot at which it contacts the receiving area.

With an actuating device according to the first aspect of the invention adjustment of a first set of one or more adjustable support frames for supporting one or more groups of actuators adjacent one or more egg chains located at a first vertical distance above a receiving area, is preferably linked to the adjustment of at least one second set of one or more adjustable support frames for supporting one or more groups of actuators adjacent one or more egg chains located at a second vertical distance above a receiving area, which second vertical distance differs from the first vertical distance. Thus, when the position of the first set of frames is adjusted to compensate for a change in speed of the egg chains, the position of the second set of frames is correctly adjusted also. It is observed that egg chains located at a different vertical distances above the receiving area, need different compensation. Thus, the sets are linked such that the sets are moved over different distances.

In the particular embodiment shown, the support frames are supported by two support axles 4, one at each end of the frames 2,3. The axles 4 mechanically link the movement of the first frame 2 to the movement of the second frame 3. The axles 4 are provided at their outer ends with sprocket wheels 10 for cooperation with racks 11 to be fixed to the frame of an egg transfer device. Thus, the axles 4 can move the frames parallel to the transport direction. It is noted that in the particular embodiment shown, the outer frame 3 is pivotably connected to the axle 4, such that this frame moves with the same speed and over the same distance as the driven axles. The inner frame 2 however is connected to the support axles via a second set of sprocket wheels 12 and racks 13. This second set functions as a multiplier, such that when the outer support frame is moved over a distance A, the inner frame is moved over a distance A+B.

Preferably, an actuating device according to the first aspect of the invention is provided with at least one drive for adjusting the position of one or more support frames, and a control device to control the at least one drive. The control device is preferably designed for receiving egg chain conveyor transport speed information and to use this information to control the at least one drive to adjust the position of the one or more movable frames linked in dependence of the transport speed.

The particular embodiment shown is provided with a single drive 8 which is in practice for example mounted on the frame of the egg transfer device the adjustment device is used with. The drive is controlled by a control device 14. The drive 8 is provided with a spindle 9 which can be extended and retracted, and which is connected to the support frame 3 supporting the outer groups 6a, 6b of actuators, to push and pull the support frame parallel to the transfer direction of the egg chains extending below it. In an alternative embodiment, the drive for example engages the axles supporting the frames, or is connected to the adjustable frames via chains and sprocket wheels, etc.

Since the movement of the two frames 6a, 6b is linked via the two supporting axles, the one drive in the embodiment shown can be used to move each frame, and thus the sets of actuators supported by that frame, over a different distance. The position of the frames can thus be adjusted parallel to the transport direction, relative to one another and relative to the main frame (not shown in FIG. 1) of a transfer device supporting the actuating device. By adjusting the position of the support frames relative to the main frame, the position of the actuators of the groups supported by the frame can be adjusted relative to the position of the actuators of the groups supported by the other frame. By adjusting the place of the actuators, the location at which the grippers are activated by the actuators is adjusted, and thus the location at which a released egg contacts a receiving area below the gripper is adjusted.

It is observed that egg chains in egg transfer devices typically run parallel to each other, at the same height and at the same speed. The receiving area of an egg transfer device is typically defined by one or more brush wheels, more in particular the circumferential surface of the brush wheels. The receiving area is thus not a horizontal surface, but a curved surface, and when defined by a pair of counter rotating brush wheels, a V-shaped surface.

With the adjusting device shown, both the location of the inner 5a, 5b and outer groups 6a, 6b of actuators can be adjusted. The actuating device 1 is especially suited for use four parallel egg chains of which the two central egg chains drop their eggs from a first height above the receiving area and the two outer egg chains drop their eggs from a second height above the receiving area. This configuration of egg chains is typical for a V-shaped receiving area, for example defined by two counter rotating brush wheels.

In an alternative embodiment, the actuator is for example designed for use with a W-shaped receiving area defined by two pairs of counter rotating brush wheels, or an essentially /-shaped receiving area defined by one brush wheel. In the latter case, the egg chains are all located at different vertical distances above the receiving area. Preferably, the actuators for each egg chain are supported by a separate adjustable frame to allow for optimal adjustment.

In a preferred embodiment, all groups of actuators are supported on a movable frame. Preferably, the actuating device is designed such that the groups of actuators which are located adjacent egg chains located at essentially the same distance above the receiving area, and which thus drop their eggs along parabolic trajectories of essentially similar shape and length, are supported by a single frame. Thus, when the transport speed of the egg chains changes, the trajectory of the eggs dropped by the egg chains located at a similar distance above the receiving area can be compensated by moving a single frame. The position of the actuators is adjusted such that the eggs released by the egg chains are dropped at a particular drop spot or in a particular zone within the receiving area, and for example do not fall short or overshoot the receiving area due to the change in transport speed.

FIGS. 2-5 show an egg transfer device 15 according to the first aspect of the invention, comprising the actuating device 1 of FIG. 1. The egg transfer device 15 further comprises an egg conveyor and an egg receiving unit 17.

The egg conveyor comprises four parallel egg chains movable in a transport direction, indicated with arrow 25. The egg chains are not shown in the figures, but in practice run below the actuating device 1, one egg chain below each group of actuators 5, 6. In FIG. 2 the egg chains are indicated by dotted lines 16. In an alternative embodiment, the egg conveyor is provided with two, three or more egg chains, and the actuating device is provided with two, three or more groups of actuators respectively.

Each egg chain supports a plurality of egg grippers. The grippers are each adapted to support an egg, and can individually be actuated from a closed position, for supporting an egg, into an open position, for releasing an egg.

The egg conveyor furthermore comprises an egg chain conveyor drive (not shown) for driving the egg chains at a transport speed. Preferably, the egg chain conveyor drive is a variable speed drive for driving the egg chains at an adjustable transport speed. With such a drive, the speed of the egg chains can be adjusted to increase or decrease the number of eggs transferred per time unit. Thus, the position of the actuators needs to be adjusted also, to compensate for the change in trajectories of the dropped eggs due to the change in transport speed. Preferably, the actuating device is designed to automatically adjust the position of the actuators when the transport speed of the egg chains changes. Furthermore, during starting and stopping the egg chains, the chain pick up speed and slow down over a certain period of time. The speed of the egg chains thus gradually changes. Preferably the actuating device is designed to gradually adjust the position of the actuators during the start up phase and the stop phase also.

In an alternative embodiment, the conveyor drive is suitable for driving the egg chains at one speed only. In such an embodiment the actuating device is preferably designed for adjusting the position of the actuators during the start up or slow down process of the transfer process when the egg chains pick up speed or gradually slow down respectively. Also, the actuating device according to the first aspect of the invention allows for adapting the location of the actuators when the egg chain drive is replaced for a faster or slower drive, or when the actuator is transferred to another egg transfer device.

The egg receiving unit 17 is provided with a receiving area 18 for receiving eggs released by the egg grippers. The receiving area 18 in the particular embodiment shown is defined by a pair of counter rotating brush wheels 19, which are each rotatable about an axle parallel to the transport direction 25 of the egg chains. The receiving area 18 is located below the egg conveyor such that the vertical distance between one egg chain and the receiving area is larger than the vertical distance between another egg chain and the receiving area.

Figure 6:
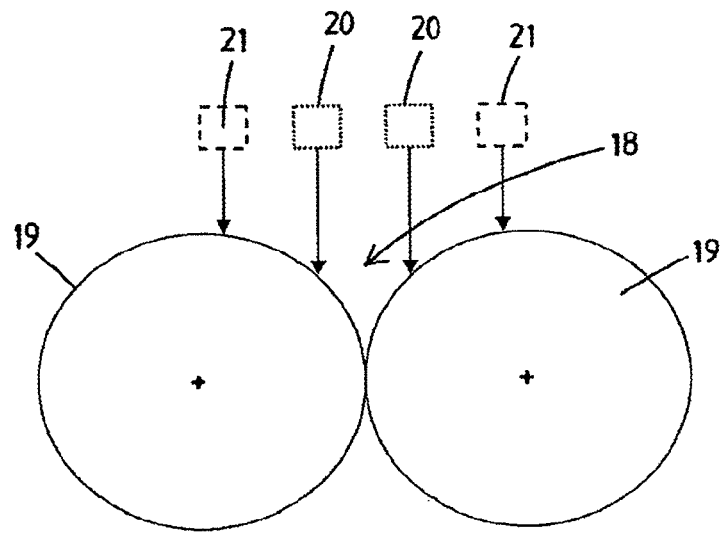
FIG. 6 shows a simplified view in cross section of the transfer device shown in FIGS. 2-5.

FIG. 6 shows a simplified view in cross section of the egg chains 20 located above the pair of brush wheels 19. The receiving area 18 defined by the brush wheels is essentially V-shaped. The central pair of egg chains is located above a lower portion of the receiving area, and the pair of outer egg chains is located above the top portion of the receiving area.

The receiving area of the particular embodiment shown is in the transport direction 25 divided into multiple adjacent receiving areas 18'. Each brush wheel 19 is divided into two sections which each are divided into six sections 18'. The sections of the two counter rotating brush wheels 19 together form such a receiving area 18'. The brush wheels 19 are divided into multiple segments by disc shaped divider wheels 22. The disc shaped divider wheels 29 are preferably made of a flexible material such as rubber and prevent an egg from crossing the boundary between the receiving areas. Divider discs are generally known form the prior art and are therefore not elaborated upon here. In an alternative embodiment, the receiving areas may be separated by other solutions known form the prior art, or may not be physically separated.

Below the receiving area 18, collecting devices 23 are provided in the form of multiple lanes 24 associated with the multiple receiving areas 18' of the counter rotating brush wheels 19. The egg received in a particular receiving area, is dropped from the brush wheels in the lane located below that receiving area and guided away from the receiving unit, for example to a transport conveyor or packaging device for further processing the eggs.

In the embodiment shown, the actuator device 1 is provided with two adjustable support frames 2, 3. One support frame 2 supports the actuators 7 located along the central egg chains 20 which are located above the bottom part of the receiving area 18, and the other movable frame 3 supports the actuators 7 located along the egg chains 21 located above the top portion of the receiving area 18. Preferably, the support frames are movably supported by the frame of the transfer device, for example by wheels or roller bearings.

Each egg chain is provided with one actuator for each receiving area, thus each group of actuators 5a, 5b, 6a, 6b comprises twelve actuators 7, such that from each egg chain eggs can be delivered in each receiving area. From the top view shown in FIGS. 2 and 4 it is clear that each egg chain is provided with an actuator 7 linked to each receiving area.

The transfer device is provided with a drive 8 for adjusting the position of the support frames, and a control device 14 which controls the drive to adjust the position of both frames in dependence of the transport speed, such that an egg dropped above the bottom part of the receiving area enters the brush wheel at essentially the same in line, when seen perpendicular to the transport direction, as an egg dropped above the flank part of the receiving area, indifferent of the transport speed of the egg chains.

The device is provided with a drive 8 for adjusting the position of the two support frames, and a control device 14 to control the drive 8. The control device 14 is designed for receiving egg chain conveyor transport speed information and to use this information to control the at least one drive to adjust the position of the one or more movable frames linked in dependence of the transport speed.

In the particular embodiment shown, the two support frames 2,3 are supported by two support axles 4, one at each end of the frames, which mechanically link the movement of the first frame 2 to the movement of the second frame 3. The axles 4 are provided at their outer ends with sprocket wheels 10 for cooperation with racks 11 to be fixed to the frame of the egg transfer device. The axles 4 can drive in the racks 11 and thus move the frames 2,3 parallel to the transport direction 25. It is noted that in the particular embodiment shown, the outer frame 3 is pivotably connected to the axle, such that this frame moves with the same speed and over the same distance as the axles 4. The inner frame 2 is connected to the support axles 4 via a second sprocket wheel 12 and rack 13 connection. This connection functions as a multiplier, such that when the outer support frame is moved over a distance A, the inner frame is moved over a distance A+B. This effect is clearly shown in the two top views of FIGS. 2 and 4.

FIG. 2 shows the frames 2, 3 located in a position for dropping the eggs at a low transport speed. In the figure shown, the egg chains, indicated with dotted lines 16, move the eggs in a transport direction from right to left and indicated with arrow 25. The actuator 7 for each receiving area 8' is located above the receiving areas in which the egg dropped by the activated egg gripper should fall. It is observed that at a low speed the actuators for actuating grippers of the central two chains, located above the bottom portion of the receiving area, are located in line with the actuators for actuating grippers of the outer two egg chains.

FIG. 4 shows the frames 2, 3 located in a position for dropping the eggs at a high transport speed. Compared to FIG. 2, the support frames are moved to the right, i.e. upstream relative to the transport direction 25. The actuators 7 are located upstream the receiving areas 8' in which an egg released by actuation of a gripper by the particular actuator drops. At high transport speeds, the actuators activate the grippers prior to arriving at the receiving area. Due to the transport speed, a released egg travels into the transport direction during the drop and thus follows a parabolic trajectory from the release point to the point where the egg contacts the receiving area and ethers the rush wheel.

The eggs dropped above the bottom section of the receiving area fall over a large vertical distance compared to the eggs dropped above the higher portion of the receiving area. These eggs thus travel further in the transport direction after release by the actuator. With an actuating device according to the first aspect of the invention, the eggs carried by the egg chains located above the lower portion of the receiving area are released further upstream than the eggs carried by egg chains located above the higher portion of the receiving area, such that even at high speeds the eggs of both the inner and outer egg chains are received in the proper receiving area, and do not overshot.

The first aspect of the invention thus provides a method for adapting the position of actuators for actuating egg grippers supported by egg chains which are located at different heights above a receiving area, using an actuating device as described above to compensate for a change in the speed of the egg chains, which compensation differs in dependence on the vertical distance between the egg chain, more in particular the grippers supported by that egg chain, and the receiving area.

Since an actuating device according to the first aspect of the invention allows for positioning support frames, more in particular the groups of actuators, over different distances, the actuators can be located such that egg dropped from different heights enter the brush wheels in spots located essentially in line with each other, when seen perpendicular to the transport direction, at all transport speeds. This allows for narrow receiving areas and thus for compact transfer devices.

In a preferred embodiment, the control device which controls the drive for adjusting the position of the frames is provided with information about the transport speed of the egg chains, for example via a sensor or from a control device of the egg chain drive. Based on this information the position of the frames is adjusted such that the eggs released by actuating the grippers drop in the correct receiving areas. The correct position of the one or more frames for a particular transport speed are for example provided in a table in a memory of the control device. In this table different speeds are linked to locations of the support frames. Preferably the frames are linked such that by the correct adjustment of the position of one frame the other frames are moved such that their position is adjusted correctly also.

In an alternative embodiment, the control device is provided with sensor devices which monitor the trajectory of dropped eggs relative to the receiving areas. The control device can use this feedback information to correctly adjust the position of the frames.

The preferred embodiment of an egg transfer device shown in FIGS. 2-5 is furthermore provided with finger shaped divider brushes 26. These finger shaped brushes are located above and between the receiving areas 18' to prevent eggs dropped at high speed from skidding over the brush wheel surface into the adjacent receiving area.

The egg transfer device is furthermore provided with braking brushes 27 which are provided above the brush wheels 18 to reduce the falling speed of the eggs prior to contacting the brush wheels. The braking brushes 27 are provided along the entire receiving area 18 and are not divided in receiving sections 18' like the brush wheels 19. The braking brushes 27 extend at an angle to the horizontal, which facilitates entry of a dropped egg between the bristles of the brush.

The braking brushes and the finger shaped brushes slow down the eggs during their fall, and reduces their speed into the transport direction. Thus, the influence of an increase in transport speed on the trajectory of the egg is reduced. The actuating device can be used with higher transport speeds when combined with the brushes.

Figure 7:
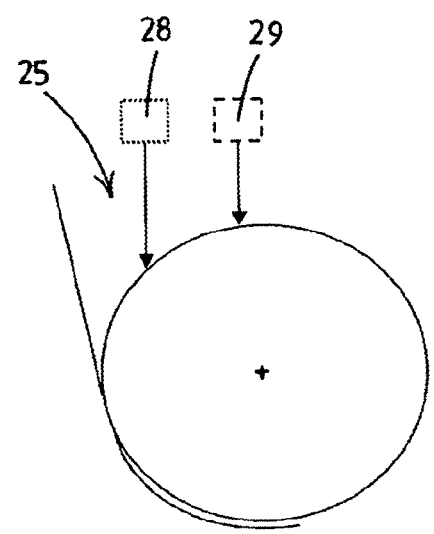
FIG. 7 shows a simplified view in cross section of an alternative transfer device according to the first aspect of the invention.

FIG. 7 shows an alternative embodiment of an receiving area 25, which receiving area is defined by one brush wheel 26 rotatable about an axle parallel to the transport direction of the egg chains and a curved plate adjacent said brush wheel. The receiving area 25 is essentially /-shaped, and has half the width of the receiving area shown in FIG. 6 when a brush wheel with a similar diameter is provided. Two egg chains 28, 29 are located above the brush wheel, one egg chain 28 above the lower portion of the receiving area and one egg chain 29 above the top portion of the receiving area 25. With such a transfer device, at least the actuators for the egg chain 28 located above the lower portion of the receiving area 25 are supported by a moveable support frame. Preferably the actuators for the egg chain 29 located above the higher portion of the receiving area are supported by a support frame also, such that both groups of actuators can be moved relative to the receiving area and relative to each other. Embodiments of an actuating device according to the first aspect of the invention for use with other configurations of receiving areas and/or number of egg chains are possible.

In an embodiment alternative to the one shown in FIG. 1 the at least two sets of adjustable support frames are mechanically linked using a linkage system or other mechanical system. In an alternative embodiment according to the first aspect of the invention, the at least two sets of adjustable support frames are each linked to the drive via a separate transmission, or the at least two sets of adjustable support frames are each provided with a drive, and the control device is designed to control the drives such each set can be moved over a different distance. In a further embodiment, a first frame is adjusted by a first drive mounted on a second adjustable support frame which frame in turn is adjusted by a second drive mounted on the frame of an egg transfer device (or another adjustable frame). Thus, the second drive moves both the second frame and the first frame supporting the first drive. The first drive moves the first frame only. To move the first frame over a distance A+B, the first drive moves the first frame over the distance B and the second drive moves the second frame over the distance A.

In a further preferred embodiment according to the first aspect of the invention, each frame is provided with multiple locations for fastening an actuator, such that the location of the one or more actuators in the frame can be adapted to allow usage of the actuating device with different egg transfer devices, for example with a transfer device provided with differently sized and/or spaced receiving areas.

Now referring to FIGS. 8-12 the second aspect of the present invention will be illustrated. It is noted that the FIG. 8 already discloses to the skilled person that the second aspect of the invention can be combined with the egg transfer device.

Figure 8:
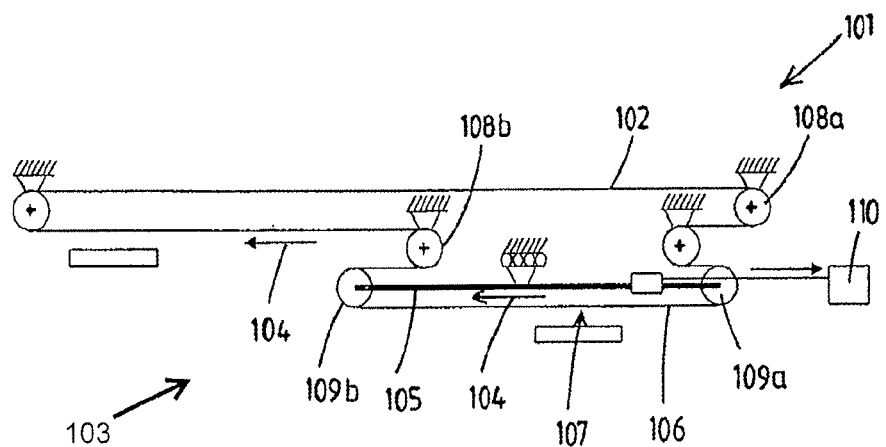
FIG. 8 shows a simplified side view perpendicular to the transport direction of an egg transfer device according to the second aspect of the invention in a first position.

FIG. 8 shows an egg transfer device 101 according to the second aspect of the invention. The egg transfer device 101 comprises four egg chains 102, of which only one shows in this particular side view. It is observed that in alternative embodiments, the device can be provided with less or more egg chains, preferably two or more. It is furthermore observed that, in an embodiment in which the egg chains extend perpendicular to the supply conveyor, the number of egg chains is equal to the number of rows lifted by the transfer unit.

The more rows the transfer unit lifts in one turn, the more time there is to return the transfer unit back into the lift up position, which allows for a more stable movement and a low power drive for moving the driven support.

The egg chains are provided with grippers (not shown), hanging down from the egg chains, for engaging eggs and for carrying the eggs along the lower run 103 of the egg chains. The eggs are transported at a transport speed and in a transport direction, which is indicated with arrow 104.

Figure 10:
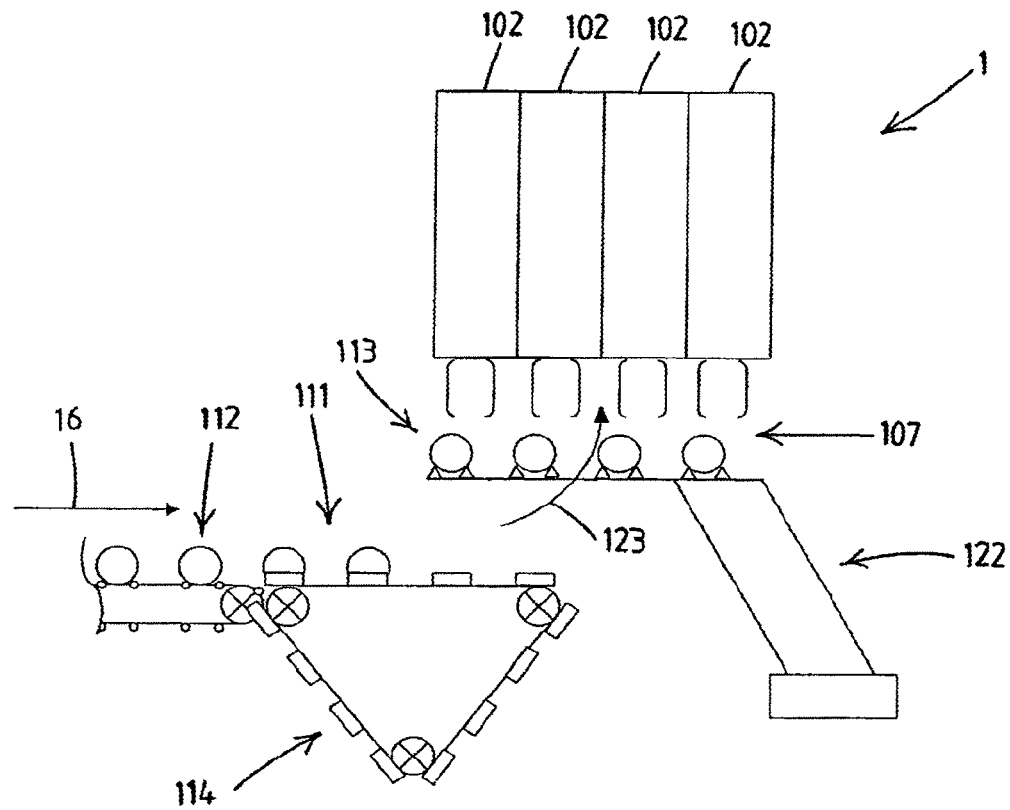
FIG. 10 shows a side view parallel to the transport direction of an egg transfer device according to the second aspect of the invention comprising a transfer buffer and a transfer unit.

The transfer device comprises a transfer buffer 111 and a transfer unit 113 to feed the eggs supplied by a supply conveyor 112 to the grippers of the egg chains 102. FIG. 10 shows a side view, seen in the transport direction of the egg chains, of the transfer buffer 111 for receiving rows of eggs from a supply conveyor 112, and a transfer unit 113 for lifting eggs from the transfer buffer into the transfer location 107 above the transfer buffer. The direction of movement is indicated with arrow 123. The transfer unit 113 and the transfer buffer 111 are located below the egg chains 102 of the transfer device.

Figure 11:
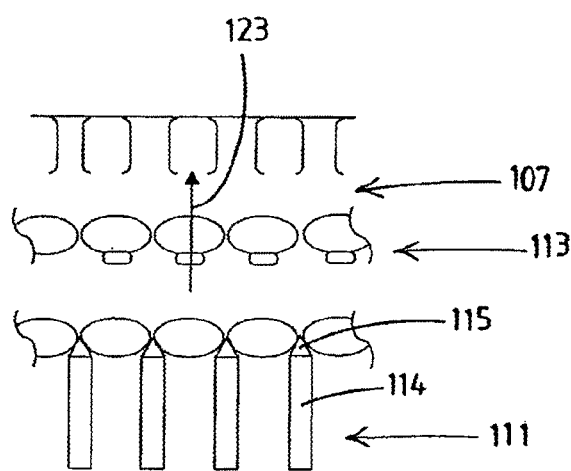
FIG. 11 shows a side view perpendicular to the transport direction, in close up, of the egg transfer device of FIG. 10.

FIG. 11 shows a view in close up of the transfer buffer seen in the transport direction. The transfer buffer receives the eggs from the supply conveyor 112, on which the eggs for example are supported by rails or rolls. The transfer buffer 111 comprises parallel fingers 114 supporting egg supports 115 for movement along the fingers in a supply direction 116. Each egg is supported on two fingers 114 such that the transfer unit 113 can move between the fingers 114 to engage the supported egg from below, while the egg is moved along the fingers 114 in the supply direction 116. In the particular embodiment shown, the fingers 114 comprise endless tracks provided with egg supports 115. The endless tracks move the eggs along the fingers 114 in the supply direction 116. By using endless tracks, the eggs are transported with a continuous speed along the fingers, which reduces the risk of the eggs falling from the egg supports 115.

In an alternative embodiment, solutions known in the art for moving eggs may be provided to transport the eggs along the fingers.

The transfer unit 113 for lifting eggs from the transfer buffer 111 into the transfer location 107 above the transfer buffer comprises parallel fingers 123 supporting egg supports also. The fingers 123 of the transfer unit 113 are designed for cooperation with the fingers 114 of the transfer buffer 111. The fingers of the transfer unit can be moved between the fingers of the transfer buffer to pick up the eggs from below. From FIG. 11 it is clear that the fingers 123 of the transfer unit 113 are located between the fingers 114 of the transfer buffer 111. The transfer unit shown supports the eggs each on one finger. It is observed that in an alternative embodiment, the eggs may be supported by multiple fingers of the transfer unit and/or the transfer buffer respectively, which fingers are positioned such that the fingers of the transfer unit can move between the fingers of the transfer buffer.

In a further preferred embodiment, the transfer unit is provided with fingers which move between the rows of eggs presented on the transfer buffer, and engage the eggs from the sides. In such an embodiment the transfer unit does not engage the eggs from below the egg supports of the transfer buffer. Thus, in this embodiment the transfer buffer does not need to be provided with fingers.

Figure 12:
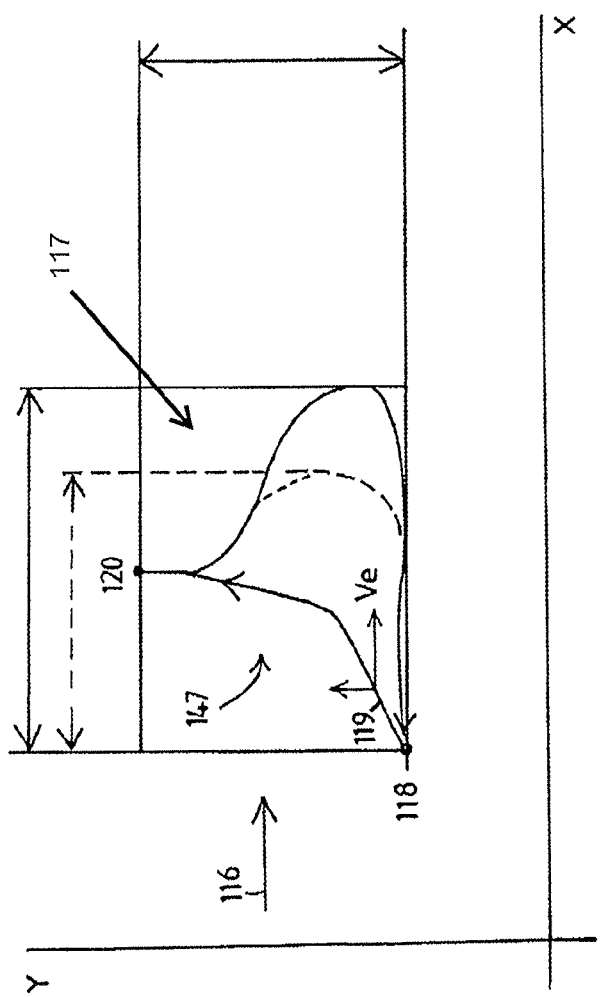
FIG. 12 shows a trajectory of the transfer unit of FIG. 10.

In a transfer device according to the second aspect of the invention, the transfer unit 113 is supported by a driven support 122 for movement of the transfer unit along an endless transfer trajectory 117 extending in a vertical plane parallel to the supply direction 116. FIG. 12 shows the transfer trajectory 117. The transfer unit is moved along the trajectory from a start location 118, in the preferred embodiment shown located below the buffer, via a lift up location 119 between the parallel rows of egg supports into the transfer location 120 and back down into the start location. The preferred transfer trajectory 117 shown allows for optimal engaging the eggs from the transfer buffer, and optimally presenting the eggs to the grippers of the egg chains in the transfer location.

The drive support 122 of the transfer unit 113 is designed such that the direction of movement of the transfer unit in the start location 118 is inverted from a movement essentially contrary to the supply direction 116 to a movement into the supply direction 116. The transfer unit is moved into the start position 118 in an essentially horizontal direction, which allows to correctly position the transfer unit 113 below the eggs supported by the transfer buffer 111 in an efficient way. In prior art devices, the transfer unit is typically moved along a curved trajectory which requires more space to allow the transfer unit to be correctly positioned.

Furthermore, the drive support 122 of the transfer unit 113 is designed such that the transfer unit is moved along the transfer trajectory such that in the transfer location 119 the transfer unit 113 moves in the supply direction as well as in the upward direction through the transfer buffer 111 for picking up the eggs during transport by the transfer buffer in the supply direction. Thus, the eggs can be lifted from the transfer buffer while still being transported in the supply direction. This allows for transfer of the eggs with minimal accelerations, and thus minimizes the chance of breakage of the eggs.

Furthermore, the driven support 122 of the transfer unit 113 is designed such that the direction of movement of the transfer unit 113 in the transfer location 120 of the transfer trajectory is inverted from an essentially upward direction into an essentially downward direction such that an egg is transferred into an essentially vertical direction into a gripper located in the transfer location 107. Thus the eggs are moved upward into the downward hanging grippers, without substantial movement in other directions. Preferably, the egg is engaged by the gripper at the moment the movement is inverted from upward to downward at which the vertical speed is zero.

It is observed that given the trajectory shown in FIG. 12, it lies within the general knowledge of the skilled person to design a driven support for movement of the transfer unit along that trajectory. It is furthermore observed that a transfer unit moved along an alternative, less optimal, trajectory can also be used for feeding the eggs into the pick up position.

In the particular embodiment shown, a movable support frame 105 is provided for supporting a section 106 of the egg chains 103 adjacent a transfer location 107. The support frame 105 is supported for movement parallel to the transport direction 104.

A section 106 of the lower run of the egg chains 102 is looped via a first loop wheel 108a and a second loop wheel 108b over the movably mounted support frame 105 such that a section 106 of the egg chains 102 extends adjacent the transfer location 107.

The support frame 105 comprises a first guide wheel 109a at one end for receiving the egg chains from the first loop wheel 108a and a second guide wheel 109b at an opposite end for guiding the egg chains towards the second loop wheel 109b. It is observed that in the distance between the guide wheels on the opposite ends of the movable support frame is larger than the distance between the loop wheels such that the egg chains guided by a loop wheel and a guide wheel follows a S-shaped trajectory.

A drive 110 is provided for moving the support frame 105 parallel to the transport direction 104 such that when the frame 105 is moved contrary to the transport direction, the movement of the section 106 of the egg chains adjacent the transfer location 107 is reduced relative to the transport speed to allow the grippers to pick up eggs provided in the transfer location.

Figure 9:
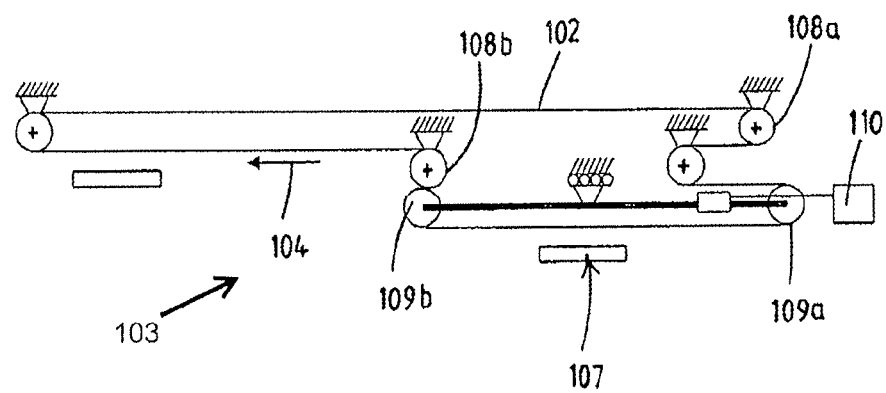
FIG. 9 shows a simplified side view perpendicular to the transport direction of the egg transfer device of FIG. 8 in a second position.

FIG. 8 shows the transfer device 101 with the movable support frame 105 in a first position, and FIG. 9 shows the transfer device with the movable support frame in a second position. The drive 110 moves the frame between these positions. When the frame is moved in a direction opposite to the transport direction, i.e. from the position shown in FIG. 8 into the position shown in FIG. 9, the section of the egg chains supported by the frame is moved in a direction opposite the transport direction also. By this movement of the frame 105, the speed relative to the pick up position of the sections of the egg chains 106, extending along the transfer location 107, is reduced. Thus the egg chains move along the transfer location with a speed lower than the transport speed, which facilitates engaging eggs presented in the transfer location with the grippers supported by the egg chains.

Preferably, the drive is designed to move the support frame contrary to the transport direction with a speed such that the movement of the section of the egg chains adjacent the transfer location is essentially reduced to near stand still, preferably stand still, such that the grippers are essentially stationary relative to the transfer location when engaging the eggs in the transfer location.

After the eggs are picked up by the grippers, the frame is moved in the transport direction to return to its initial position shown in FIG. 8. This movement of the frame accelerates the egg chains supported by the frame up to a speed higher than the transport speed. Since the eggs are at this moment securely held in the grippers, this chance of breakage of the eggs is minimal. When the section of the egg chains has passed the guide wheel guiding the egg chain towards the second loop wheel, the speed of the egg chain is reduced to transport speed. Thus, outside the looped section, the eggs are transported at transport speed, while the speed of the egg chains adjacent the transfer location is reduced to pick up the eggs.

With an egg transfer device according to the second aspect of the invention, eggs are transported by egg chains at a transport speed, while the speed of sections of the egg chains can be reduced to facilitate picking up eggs. Thus the transfer device provides egg chains which combine optimal transport speed with optimal pick up speed in one transfer device. Preferably, the egg transfer device is designed for receiving a flow of eggs which is provided in a supply direction perpendicular to the transport direction, which allows to pick up high quantities of eggs at the optimal pick up speed and thus to use the egg chains as the high volume transport device they are intended for.

The egg transfer device shown is furthermore provided with a drop off location 120 along the lower run 103 of the egg chains 102 for dropping off eggs. The drop off location 121 is provided downstream of the looped section 106 adjacent the transfer location 107.

In a further embodiment, the egg transfer device further comprises an additional movable support frame, similar to the one in the transfer location, for supporting a looped section of the egg chains adjacent the drop off location such that the movement of the section of the egg chains adjacent the drop off location can be temporarily reduced to drop off eggs. Thus, the movement of the eggs in the horizontal plane is at least reduced relative to the transport speed, preferably the egg is held stationary, such that it can be dropped into stationary receiving devices, such as a receptacle or packaging, with more accuracy. Dropping the eggs from stationary grippers highly increase the precision of delivery. Furthermore, the receptacle for receiving the eggs can be provided without bringing it up to the transport speed of the egg chains. Thus presenting the receptacle is facilitated. In the prior art, the transport speed is often limited to allow for accurate feeding of egg into receptacles.

In a further embodiment according to the invention, the direction of movement of the transfer unit, the transfer buffer, the supply conveyor and optionally the egg chains is inverted to provide an egg transfer device for receiving egg form an egg chain and feeding those eggs to a conveyor. Except for the direction of movement the egg transfer device is similar to the ones described here above.

Such an egg transfer device thus comprises multiple parallel egg chains provided with grippers for engaging eggs and for carrying the eggs along the lower run of the egg chains at a transport speed in a transport direction. The direction of movement of the egg chains is not relevant for the working of the transfer unit and the transfer buffer, especially when the egg chains are slowed down or even stopped in the transfer location.

The transfer unit for receiving multiple rows of eggs from the egg chains in the transfer location directly below the egg chains is supported by a driven support for moving the transfer unit along an endless transfer trajectory extending in a vertical plane parallel to the supply direction such that the transfer unit can be moved from. The trajectory can be similar to the one of the egg transfer device described here above, although the direction of movement is inverted.

The transfer unit thus lowers the eggs from the transfer location below the egg chains to the transfer buffer, which moves the eggs towards the supply conveyor which in turn moves the eggs in a supply direction with a supply speed away from the egg transfer device, more in particular away from the transfer buffer.

Since the direction of movement along the transfer trajectory is inverted it is local to rename the "lift up" location as "let down" location and the "start position" as "end position". Thus the transfer unit moves form the transfer location, via the let down location for releasing the eggs, into the end location and back up into the transfer location. The driven support is designed such that in the let down location the transfer unit moves in the supply direction, preferably with the supply speed, as well as in the downward direction through the transfer buffer for setting down the eggs on the transfer buffer. The transfer buffer subsequently transports the eggs into the supply direction and to the supply conveyor.

The direction of movement of the transfer unit in the transfer location is inverted from an essentially upward direction into an essentially downward direction such that an egg is received in an essentially vertical direction from a gripper.

It is observed that when the text refers to egg chains, this may also comprise transport chains supporting multiple rows of egg grippers. Thus, one chain can transport multiple rows of eggs. In such an embodiment groups of actuators are provided for each row of egg gripper.

It is furthermore observed that the device according to the invention are also suitable for use with transfer device for transporting other round, fragile articles such as for example fruit or vegetables.

What is claimed is:

1. An egg chain gripper actuating device for use with an egg transfer device comprising:
    an egg conveyor with two or more parallel egg chains movable in a transport direction, each egg chain supporting a plurality of egg grippers each adapted to support an egg, which grippers can individually be actuated from a closed position, for supporting an egg, into an open position, for releasing an egg, the egg conveyor further comprising an egg chain conveyor drive for driving the egg chains at a transport speed;
    an egg receiving unit with a receiving area for receiving eggs released by the egg grippers which receiving area is defined by at least one brush wheel rotatable about an axle parallel to the transport direction of the egg chains and which is located below the egg conveyor such that the vertical distance between one egg chain and the receiving area is larger than the vertical distance between another egg chain and the receiving area;
    wherein the egg chain gripper actuating device comprises:
    one group of one or more actuators for each egg chain, which actuators are designed for selectively actuating passing egg grippers into an open position to release an egg such that the released egg follows a parabolic trajectory from a release spot at which it is released by the gripper to a contact spot at which it contacts the receiving area; and multiple support frames, each supporting one or more groups of actuators, of which at least one frame is adjustable parallel to the transport direction and relative to another frame, such that the position of the actuators of the one or more groups supported by the frame can be adjusted relative to the position of the one or more actuators of the one or more groups supported by the other frame.

2. An actuating device according to claim 1, wherein at least one frame supports two or more groups of actuators for locating along two or more egg chains respectively, which chains are located at a similar vertical distance above the receiving area such that they drop their eggs along parabolic trajectories of similar shape and length.

3. An actuating device according to claim 1, further comprising at least one drive for adjusting the position of one or more support frames, and a control device to control the at least one drive.

4. Egg transfer device according to claim 3, wherein the control device is designed for receiving egg chain conveyor transport speed information and to use this information to control the at least one drive to adjust the position of the one or more movable frames linked to the drive in dependence of the transport speed.

5. An actuating device according to claim 1, wherein the adjustment of a first set of one or more adjustable support frames for supporting one or more groups of actuators adjacent one or more egg chains located at a first vertical distance above a receiving area, is linked to the adjustment of at least one second set of one or more adjustable support frames for supporting one or more groups of actuators adjacent one or more egg chains located at a second vertical distance above a receiving area, which second vertical distance differs from the first vertical distance, such that when the position of the first set of frames is adjusted to compensate for a change in speed of the egg chains, the position of the second set of frames is correctly adjusted also.

6. An actuating device according to claim 5, wherein the at least two sets of adjustable support frames are mechanically linked, such that one drive can be used to move each set over a different distance.

7. An actuating device according to claim 5, wherein the at least two sets of adjustable support frames are each linked to a drive via a separate transmission, which transmissions are designed such that the one drive can be used to move each set over a different distance.

8. An actuating device according to claim 5, wherein the at least two sets of adjustable support frames are each provided with a drive, and the control device is designed to control the drives such that each set can be moved over a different distance.

9. An actuating device according to claim 1, wherein each frame is provided with multiple locations for fastening actuators, such that the location of the one or more actuators in the frame can be adapted to allow usage of the actuating device with egg transfer devices that require a different configuration of actuators in the frame.

10. An egg transfer device comprising:

an egg conveyor with two or more parallel egg chains movable in a transport direction, each egg chain supporting a plurality of egg grippers each adapted to support an egg, which grippers can individually be actuated from a closed position, for supporting an egg, into an open position, for releasing an egg, the egg conveyor further comprising an egg chain conveyor drive for driving the egg chains at a transport speed;

an egg receiving unit with a receiving area for receiving eggs released by the egg grippers which receiving area is defined by at least one brush wheel rotatable about an axle parallel to the transport direction of the egg chains and which is located below the egg conveyor such that the vertical distance between one egg chain and the receiving area is larger than the vertical distance between another egg chain and the receiving area; and the actuating device according to claim 1.

11. An egg transfer device according to claim 10, wherein the receiving area is defined by a pair of counter rotating brush wheels, each rotatable about an axle parallel to the transport direction of the egg chains and both located below the egg chains.

12. An egg transfer device according to claim 10, wherein the receiving area is defined by the at least one brush wheel rotatable about an axle parallel to the transport direction of the egg chains and a curved guide surface adjacent said brush wheel.

13. An egg transfer device according claim 10, wherein the egg chain conveyor drive is a variable speed drive for driving the egg chains at an adjustable transport speed.

14. An egg transfer device according to claim 10, wherein the receiving area is in the transport direction divided into multiple adjacent receiving areas, and wherein each egg chain is provided with an actuator linked to each receiving area.

15. An egg transfer device according to claim 14, further comprising divider brushes which are provided above and between the receiving areas to prevent eggs from skidding over the brush wheel into the adjacent receiving area.

16. An egg transfer device according to claim 10, wherein one support frame is provided for supporting a group or groups of actuators of each set of egg chains located at the same vertical distance from the receiving area.

17. An egg transfer device according to claim 10, further comprising braking brushes which are provided above the receiving area to reduce the falling speed of the eggs prior to falling into the brush wheels.

18. Method for adapting the position of actuators for actuating egg grippers supported by egg chains which chains are located at different heights above a receiving area, using an actuating device according to claim 3 to compensate for a change in the transport speed of the egg chains, which compensation depends on the vertical distance between the egg chain, more in particular the grippers supported by that egg chain, and the receiving area, the method comprising the steps:

providing egg chain conveyor transport speed information to the egg chain gripper actuating device;

control the at least one drive to adjust the position of the at least one adjustable support frame in dependence of the transport speed; and adjust the position of the at least one adjustable support frame parallel to the transport direction and relative to another support frame.

* * * * *